US005983488A

United States Patent [19]
Erickson et al.

[11] Patent Number: 5,983,488
[45] Date of Patent: Nov. 16, 1999

[54] SOL-CASTING OF MOLTEN CARBONATE FUEL CELL MATRICES

[75] Inventors: Diane S. Erickson, Downers Grove; Charles R. Bernat, Oak Park, both of Ill.

[73] Assignee: M-C Power Corporation, Burr Ridge, Ill.

[21] Appl. No.: 08/902,991

[22] Filed: Jul. 30, 1997

[51] Int. Cl.⁶ .................................................. B23P 19/00
[52] U.S. Cl. ............................ 29/731; 29/730; 29/623.1; 429/46; 429/320; 429/41; 427/115; 205/343
[58] Field of Search .............................. 29/730, 738, 731, 29/623.1; 427/115; 205/343; 419/5, 10, 19, 40, 43, 50, 53–55; 423/600, 593; 429/30, 33, 41, 44, 46

[56] References Cited

U.S. PATENT DOCUMENTS

| | | | |
|---|---|---|---|
| 4,115,632 | 9/1978 | Kinoshita et al. | 429/188 |
| 4,540,640 | 9/1985 | Iacovangelo et al. | 429/41 |
| 5,191,183 | 3/1993 | Balbaa et al. | 219/10.55 M |
| 5,252,315 | 10/1993 | Higashiyama et al. | 423/593 |
| 5,316,555 | 5/1994 | Ong et al. | 29/623.1 |
| 5,316,695 | 5/1994 | Wilkes et al. | 252/315.6 |
| 5,340,514 | 8/1994 | Taniguchi et al. | 264/62 |
| 5,432,138 | 7/1995 | Hofmann | 501/153 |
| 5,449,479 | 9/1995 | Clark et al. | 264/67 |
| 5,453,101 | 9/1995 | Ong | 29/623.5 |
| 5,473,008 | 12/1995 | Hessel et al. | 524/561 |
| 5,545,427 | 8/1996 | Boilot et al. | 427/6 |

FOREIGN PATENT DOCUMENTS

| | | |
|---|---|---|
| 4030945 | 4/1992 | Germany . |
| 61-010057 | 1/1986 | Japan . |

OTHER PUBLICATIONS

Bohme, O. et al.: Development of Materials and Production Technologies for Molten Carbonate Fuel Cells, *International Journal of Hydrogen Energy*, 19 (1994), Apr., No. 4, pp. 349–355, Head. Hill Hall, Oxford, GB.

Manufacture of fuel–cell matrix, *Chemical Abstracts*, vol. 104, No. 8, Feb. 24, 1986, Toppan Printing Co., Ltd., Japan (Abstract).

Iacovangelo, C.D. et al.: Hot–Roll–Milled Electrolyte Structures for Molten Carbonate Fuel Cells, *Journal of the Electrochemical Society*, vol. 135 (1988), Jan., No. 1, pp. 221–224, Manchester, NH.

Omatete, O.O., Janney, M.A. and Strehlow, R.A., "Gelecasting—A New Ceramic Forming Process," *Ceramic Bulletin*, vol. 70 (1991), No. 10, pp. 1641–1649, No month available.

Johnson, Jr., David W., "Sol–Gel Processing of Ceramics and Glass," *Ceramic Bulletin*, vol. 64 (1985), No. 12, pp. 1597–1602, No month available.

Pierre, Alain C., "Sol–Gel Processing of Ceramic Powders," *Ceramic Bulletin*, vol. 70 (1991), No. 8, pp. 1281–1288, No month available.

Yoldas, B.E., Alumina Sol Preparation from Alkoxides, *Ceramic Bulletin*, vol. 54 (1975), No. 3, pp. 289–290, No month available.

Watanabe, A., Takeuchi, Y. and Saeki, G., "Crystal Growth of Rod–Shaped $\beta$–LiAlO$_2$," *Journal of the American Ceramic Society*, vol. 70 (1987), No. 10, pp. C268–269, No month available.

Kinoshita, K., Sim, J.W., and Ackerman, J.P., "Preparation and Characterization of Lithium Aluminate," *Material Research Bulletin*, vol. 13 (1978), pp. 445–455, No month available.

Kinoshita, K., Sim, J.W. and Kucera, G.H., "Synthesis of Fine Particle Size Lithium Aluminate for Application in Molten Carbonate Fuel Cells," *Material Research Bulletin*, vol. 14 (1979), pp. 1357–1368, No month available.

Singhal, S.C., "Advances in Tubular Solid Oxide Fuel Cell Technology," Abstract from 1996 Fuel Cell Seminar, Nov. 17–20, 1996, Orlando, Florida.

*Primary Examiner*—Bruce F. Bell
*Attorney, Agent, or Firm*—Pauley Petersen Kinne & Fejer

[57] ABSTRACT

A process for manufacture of molten carbonate fuel cell matrices in which an aluminate precursor material and a lithium salt are mixed in an aqueous or organic solvent, resulting in formation of a suspension, the suspension is heated to a temperature less than a boiling of the solvent, resulting in formation of a slurry comprising a lithium aluminate precursor material, at least one casting additive is added to the slurry, the slurry is formed into a desired shape, the desired shape is dried or cured to yield a green molten carbonate fuel cell structure, and the green molten carbonate fuel cell structure is heated after assembly into a molten carbonate fuel cell to the molten carbonate fuel cell operating temperature, resulting in transformation of the lithium aluminate precursor material to lithium aluminate.

14 Claims, 3 Drawing Sheets

(PRIOR ART)
CURRENT TAPE CASTING PROCESS
(METHOD A)
PROCESS DIAGRAM
POWDER SYNTHESIS

| PURCHASE VENDOR LiAlO2 POWDER |

TAPE CASTING

| WEIGH POWDER AND SLIP FORMULATION INTO CASTING MIXER |

| MIX AND ATTRITION MILL SLIP |

| SLIP CHARACTERIZATION |

| PUMP SLURRY TO TAPE CASTER |

| CAST SLURRY |

| REMOVE AND CUT TAPES |

| QC: GREEN TAPE CHARACTERIZATION VISUAL, DENSITY, XRD, POROSIMETRY |

(PRIOR ART)
LITHIUM ALUMINATE POWDER
(METHOD B)
PROCESS DIAGRAM
POWDER SYNTHESIS

| WEIGH BATCH INGREDIENTS INTO MIXER |

| STIR AND HEAT @ 90 °C FOR 7 – 10 HOURS |

| PUMP SLURRY TO SPRAY DRIER |

| SPRAY DRY POWDER |

| TRANFER SEMI-WET POWDER TO ROTARY KILN |

| ROTARY KILN: 800–900 °C 2–3 HOURS |

| CRUSH POWDER TO SPEC |

| PACKAGE POWDER IN DRUMS |

| QC: POWDER CHARACTERIZATION BULK DENSITY, XRD, AA, SIEVE |

TAPE CASTING

| WEIGH POWDER AND SLIP FORMULATION INTO CASTING MIXER |

| MIX AND ATTRITION MILL SLIP |

| SLIP CHARACTERIZATION |

| PUMP SLURRY TO TAPE CASTER |

| CAST SLURRY |

| REMOVE AND CUT TAPES |

| QC: GREEN TAPE CHARACTERIZATION VISUAL, DENSITY, XRD, POROSIMETRY |

LITHIUM ALUMINATE SOL CASTING
(METHOD C)
PROCESS DIAGRAM
POWDER SYNTHESIS

CONT. FROM FIG.1A

- WEIGH BATCH INGREDIENTS INTO MIXER
- STIR AND HEAT @ 90 °C FOR 7 – 10 HOURS
- PUMP SLURRY TO MIXER/ATTRITOR

TAPE CASTING

- ADD CASTING ADDITIVES
- MIX AND ATTRITION MILL SLIP
- SLIP CHARACTERIZATION
- PUMP SLURRY TO TAPE CASTER
- CAST SLURRY
- REMOVE AND CUT TAPES
- QC: GREEN TAPE CHARACTERIZATION VISUAL, DENSITY, XRD, POROSIMETRY

FIG.1B

SOL-CASTING OF MOLTEN CARBONATE FUEL CELL MATRICES

BACKGROUND OF THE INVENTION

1. Field of the Invention

This invention relates to a process for manufacturing lower cost molten carbonate fuel cell matrices which combines chemical synthesis or sol-gel powder synthesis techniques with tape casting or doctor blading. The chemical synthesis techniques enable the use of low cost precursor materials for the production of the high-purity, high surface area lithium aluminate matrices required for high performance molten carbonate fuel cells at a fraction of the cost of a vendor-provided lithium aluminate powder. Unlike traditional powder synthesis techniques which require complete solvent removal and a heat treatment and/or grinding procedure prior to use, in the process of this invention, the solvent utilized during the chemical or sol synthesis is also utilized as the tape casting solvent.

2. Description of Prior Art

Fuel cell testing in the United States and abroad has proven that high surface area, greater than about 10–15 $m^2/g$, low density, less than about 1.0 $g/cm^3$, lithium aluminate ($LiAlO_2$) is required to ensure submicron porosity and phase stability, characteristics required to ensure sufficient carbonate retention for maximum fuel cell performance and endurance. Due to the requirements for material purity and surface area, until now, a high cost alpha- or gamma-phase powder has been the only alternative for ensuring cell performance and endurance.

State-of-the-art molten carbonate fuel cell matrices are typically formed from expensive vendor $LiAlO_2$ powder by tape casting. Tape casting involves suspending composite materials and a binder in aqueous or organic solvents and pouring the suspension into a doctor blade reservoir system. A blade opening is provided at the bottom of the reservoir and the slip is cast to a uniform height onto a moving substrate. A second blade provides improved dimensional control of the cast tape. The cast suspension passes through a drying section where the solvents evaporate, leaving behind a porous composite. Tape casting is taught, for example, by U.S. Pat. No. 5,473,008 which also teaches a casting composition comprising a ceramic powder, an organic solvent, a binder, a plasticizer and dispersant, the dispersant being a polyvinyl alcohol/fatty acid ester, and U.S. Pat. No. 5,453,101.

Gel casting refers to a ceramic forming process in which a slurry of ceramic powders in a solution of organic monomers is cast in a mold. The monomer mixture is polymerized in situ to form gelled parts. See Omatete et al., "Gel Casting—A New Ceramic Forming Process," *Ceramic Bulletin*, Vol. 70, No. 10, pp. 1641–1649. In the sol-gel processing of ceramics and glass, ceramic materials are formed through a low-temperature chemical synthesis during which a sol is formed from precursor materials. The solution is polymerized into a gel structure and heat treated to form the ceramic or glass powder. See Johnson, Jr., "Sol-Gel Processing of Ceramics and Glass," *Ceramic Bulletin*, Vol. 64, No. 12 (1985); Pierre, "Sol-Gel Processing of Ceramic Powders," *Ceramic Bulletin*, Vol. 70, No. 8, (1991), pp. 1281–1288; and Yoldas, "Alumina Sol Preparation From Alkoxides," *Ceramic Bulletin*, Vol. 54, No. 3 (1975), pp. 289–290. See also, U.S. Pat. No. 5,316,695 which teaches a polymeric catalyst, such as poly(styrene) sulfonic acid, which can be used in the synthesis of sol-gel derived ceramic materials from metal alkoxides by reaction of the metal alkoxides and a reactive endcapped polymeric modifier.

A variety of researchers have utilized various chemical precursors to manufacture lithium aluminate powders and fibers of various lithium aluminate phases. In all cases, however, a powder is the end product which is formed in a separate manufacturing procedure into the molten carbonate fuel cell matrix. See for example, Watanabe et al., "Crystal Growth of Rod-Shaped Beta-$LiAlO_2$," *Journal of American Ceramic Society*, 70 (10), C268–269 (1987); Kinoshita et al., "Preparation and Characterization of Lithium Aluminate," *Material Research Bulletin*, 13, 445–455 (1978); and Kinoshita et al., "Synthesis of Fine Particle Size Lithium Aluminate For Application in Molten Carbonate Fuel Cells," *Material Research Bulletin*, Vol. 14, (1979), pp. 1357–1368. U.S. Pat. No. 5,252,315 teaches a process for producing lithium aluminate powder by contacting a raw material powder of a lithium aluminate with water to form a hydrate, followed by dehydration by heating. U.S. Pat. No. 5,545,427 teaches a process for preparing lithium aluminosilicate or gamma lithium aluminate ceramics in which a short chain anhydrous alcohol is mixed with a liquid unpolarized aluminum alkoxide to which water is added for hydrolyzing. The resulting mixture is dried at a temperature below 300° C. to evaporate the alcohols and water and obtain a crystalline powder having a structure identical to that of beta lithium aluminate. The powder is then shaped by isostatic or non-isostatic cold pressing, by pouring a slip, by spinning, or by extruding, and subsequently sintered at a temperature of about 800° to 1200° C. Finally, U.S. Pat. No. 5,432,138 teaches a process for producing gamma lithium aluminate matrix layers for molten carbonate fuel cells using a slurry, the liquid phase of which is formed by an aqueous polyvinyl alcohol solution.

SUMMARY OF THE INVENTION

It is an object of this invention to provide a process for manufacturing molten carbonate fuel cell matrices which avoids the use of expensive vendor lithium aluminate powder, thereby resulting in lower cost molten carbonate fuel cell matrices.

It is another object of this invention to provide a process for producing high surface area, low bulk density lithium aluminate so as to ensure the submicron porosity and phase stability required for sufficient carbonate retention for maximum fuel cell performance and endurance.

These and other objects of this invention are achieved by a process for manufacture of molten carbonate fuel cell matrices comprising mixing at least one aluminate precursor material and at least one lithium salt in an aqueous or organic solvent, resulting in formation of a suspension. The suspension is then heated to a temperature less than the boiling point of the solvent, resulting in formation of a slurry comprising at least one lithium aluminate precursor material. To this slurry is added at least one casting additive, after which the slurry is formed into a desired shape by any suitable method for producing the desired shape such as tape casting, extrusion or hot roll compaction. It is within the scope of this invention that the matrix may be formed into any shape by any method which can utilize the chemical synthesis slurry. The wet slurry is then dried or cured, yielding, in the case of a tape cast sheet, a "green" molten carbonate fuel cell tape. The "green" molten carbonate fuel cell tape is then heated after assembly into a molten carbonate fuel cell to the molten carbonate fuel cell operating temperature, resulting in transformation of the lithium aluminate precursor material to lithium aluminate.

The materials utilized for forming the lithium aluminate precursor materials in accordance with one preferred embodiment of this invention are alumina hydrates mixed with lithium salts, such as lithium hydroxide. These materials form lithium aluminate hydrates or materials which will transform to a lithium aluminate at molten carbonate fuel cell operating temperatures, typically in the range of 600–700° C.

The required mixing time is a function of starting materials, the desired final powder surface area, mixing temperature and mixing rate. After chemical synthesis, casting additives such as binders, plasticizers, anti-foam agents, dispersants, release agents, and the like are added to the slurry which is then further homogenized prior to forming into the desired shape. The phase of lithium aluminate which is formed (alpha-, beta-, or gamma-phase, or a mixture thereof) is dependent upon the starting materials, the chemical synthesis procedures, the stack heat-up schedule, and the process gases utilized during stack or cell heat-up.

Although tape casting is the preferred method for producing flat sheets of molten carbonate fuel cell matrices, any process which yields thin flat sheets of molten carbonate fuel cell matrices, such as extrusion, slip casting, curtain coating and roll compaction may also be utilized. In addition, the matrix may be formed into a non-flat shape, for example a tubular construction, using a spray technique or curtain coating technique utilizing the slurry as part of the process.

BRIEF DESCRIPTION OF THE DRAWINGS

These and other objects and features of this invention will be better understood from the following detailed description taken in conjunction with the drawings wherein:

FIG. 1 is a comparison of the sol-casting process of this invention with traditional powder synthesis followed by tape casting.

DESCRIPTION OF PREFERRED EMBODIMENTS

Figure 2:
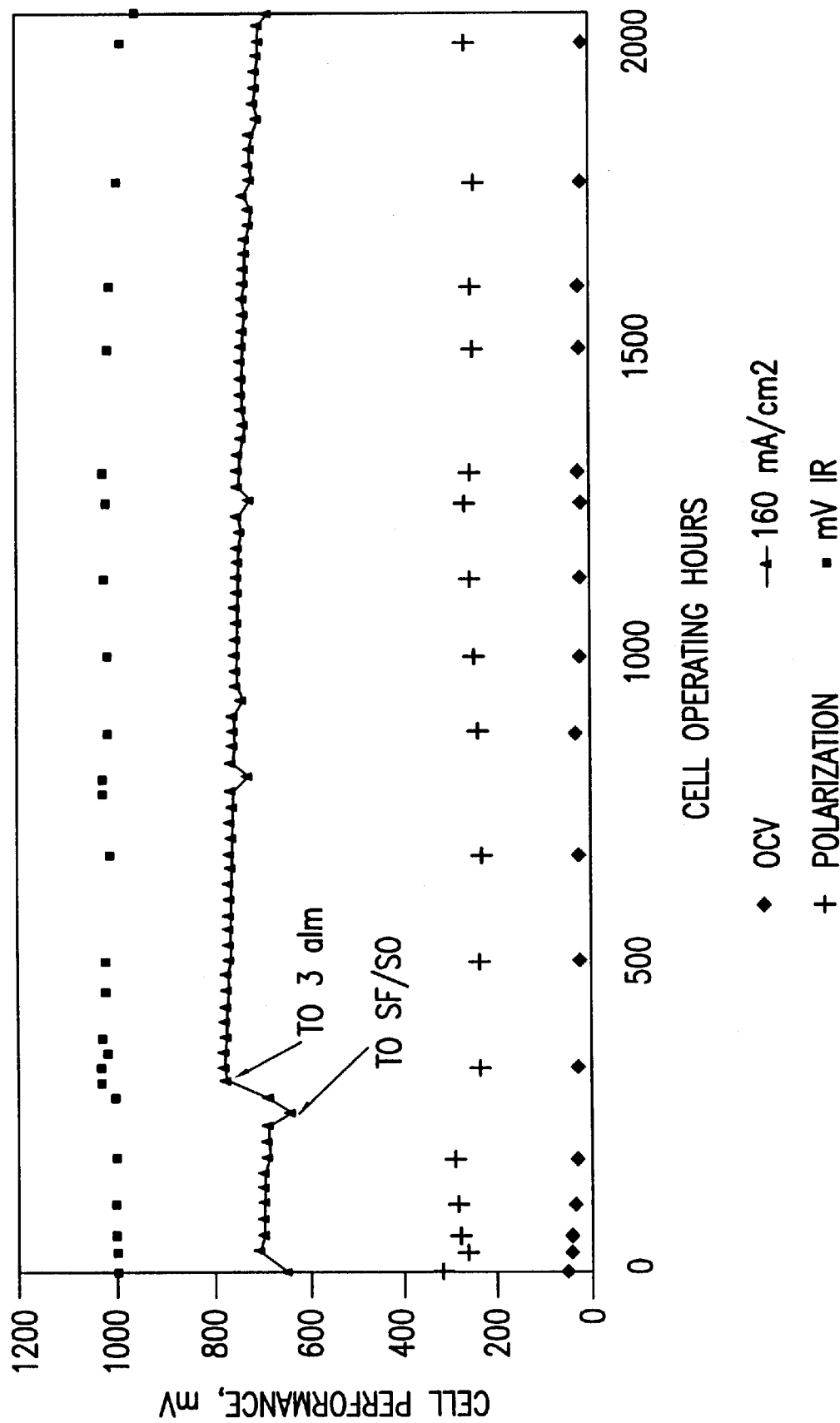
FIG. 2 is a diagram showing a bench-scale (100-cm$^2$) life graph for a cell having three layers of Example IV matrices for a total pre-test matrix thickness of 1.151 mm.

Sol-casting in accordance with the process of this invention represents a method for manufacturing low-cost molten carbonate fuel cell matrices by combining powder chemical synthesis techniques, for example sol-gel technology, with component shaping methods such as tape casting. This manufacturing process involves the formation of organic or aqueous suspensions or sols of lithium aluminate precursor materials using low cost precursor materials such as hydrated alumina ($Al_2O_3 \cdot 3H_2O$), with lithium salts such as lithium hydroxide, LiOH. Chemical synthesis and homogenization of the lithium aluminate precursor materials occur at low process temperatures, preferably less than about 100° C., in an aqueous solution forming a sol, or a dispersion of solid submicron colloidal particles in a liquid which, due to small particle sizes and surface charges, do not settle, but rather remain dispersed in the liquid medium. After chemical synthesis at low temperatures, casting additives are added to the sol mixture which is then cast using, for example, traditional tape casting techniques. Temperatures below about 100° C. are typically utilized because they are below the boiling point of the solvent. The critical aspect of the temperature during chemical synthesis is that it be below the boiling point of the solvent which, in some cases, may be greater than 100° C.

A comparison of the sol-casting process of this invention with traditional powder synthesis followed by tape casting is shown in FIG. 1. Sols formed in both aqueous and organic mediums may be used in the process of this invention and, in the case of organic mediums, can be cast using casting additives which are compatible with organic solvents. In addition, as previously indicated, alternate forming methods other than tape casting may be utilized by changing the final solids content of the mix to be more compatible with the selected forming method prior to forming.

The process of this invention has several inherent advantages over the existing procedures for manufacturing molten carbonate fuel cell matrices. These include the ability to control the powder characteristics, including particle size, morphology and purity, and the ability to couple this process with post-casting heat treatment procedures to tailor the phase of the lithium aluminate. In accordance with a preferred embodiment of this invention, the post-heat treatment procedure occurs during the heat-up and conditioning of the fuel cell stack. In accordance with other embodiments of this invention, the molten carbonate fuel cell matrices are cast onto other cell components or onto a separate substrate and heat treated in air or a reducing environment to tailor the phase or powder characteristics prior to assembly into the molten carbonate fuel cell. It should also be noted that ingredients can be added to the sol mixture to enable gel formation after casting or to enable curing methods which do not involve solvent evaporation, such as UV, microwave, high-intensity visible light, electron beams or IR radiation for curing of the casting or forming resins.

In contrast to known gel casting techniques, the process of this invention does not involve the formation of a gel with a separate heat treatment procedure. Rather, the precursor materials for lithium aluminate are intimately homogenized during a low temperature chemical synthesis procedure during which a sol is formed. The sol is tape cast, not cast into a mold, without gel formation.

In contrast to sol-gel powder synthesis techniques, the end use of the process of this invention is not a ceramic powder, but rather a molten carbonate fuel cell matrix layer made from ceramic powders. This invention depends upon heat-up in a fuel cell to obtain the lithium aluminate molten carbonate fuel cell matrix material.

Traditional chemical synthesis of lithium aluminate involves the manufacturing of lithium aluminate powder of different phases and morphologies through a chemical synthesis and heat treatment procedure. In accordance with one embodiment of the process of this invention, however, the precursor materials are mixed and tape cast into a precursor layer. The resulting tape or plaque is then placed in a fuel cell and heated to fuel cell operating temperatures where the lithium aluminate forms.

EXAMPLE I

Twelve hundred and four grams of distilled water, 108 grams of lithium hydroxide hydrate, $LiOH \cdot H_2O$, and 200 grams of hydrated alumina, $Al(OH)_3$, were added to a stainless steel beaker. The mixture was heated at an average temperature of about 90° C. and stirred continuously for 24 hours. The pH of the solution was about 12. A portion of the slip was air dried. X-ray diffraction analysis revealed that the major phase present was lithium aluminum hydroxide hydrate ($LiAl_2(OH)_7 \cdot xH_2O$) with minor amounts of lithium hydroxide hydrate ($LiOH \cdot H_2O$). The molar ratio of Al/Li was measured at 1.0, compared to a target ratio of 1.0.

After the dried sol was heated for 24 hours at 650° C., the average molten carbonate fuel cell operating temperature, the powder had transformed to mainly a mixture of beta- and gamma-lithium aluminates, with minor amounts of alpha-lithium aluminate, lithium carbonate, and aluminum oxide. The molar ratio of Al/Li was measured as 0.95 compared to a target ratio of 1.0. The surface area of the heat-treated powder was 32 m$^2$/g as measured using B.E.T. nitrogen absorption.

The effect of mix time at 90° C. was characterized for this slurry by drawing samples after 24 hours and 100 hours. Comparison of the X-ray diffraction (XRD) patterns of the 24-hour and 100-hour samples air dried and the XRD patterns of the samples heated for 24 hours at 650° C. in air, revealed that the major phases did not change with mix time. A change in the surface area of the samples heated to 650° C. was observed: the surface area of the sample mixed for 24 hours was 32 m$^2$/gm while that of the sample mixed for 100 hours was 22 m$^2$/gm.

One hundred grams of this sol mix were mixed with 1 gram of dispersant and 3.75 grams of Saffil alumina fibers in a plastic beaker for 30 minutes using a mechanical mixer. 20.8 grams of a latex emulsion binder solution were added to the sol and mixed with a spatula by hand. This slurry was cast onto a Teflon substrate using a 6-inch wide doctor blade and allowed to dry overnight. The green density of the dry tape was 0.6 g/cc.

EXAMPLE II

Twelve hundred grams of distilled water, 108 grams of lithium hydroxide hydrate, and 200 grams of aluminum trihydrate were added to a stainless steel beaker. The mixture was heated at an average temperature of 90° C. and stirred continuously for 100 hours. The pH of the solution was about 12. A portion of a slip was air dried. X-ray diffraction analysis revealed that the major phase present was lithium aluminum hydroxide hydrate with minor amounts of lithium hydroxide hydrate. A trace of Gibbsite (Al(OH)$_3$) was also found in this sample. The molar ratio of Al/Li was measured as 0.97 compared to a target ratio of 1.0.

After the dried sol was heated for 24 hours at 650° C., the powder had transformed to mainly a mixture of beta- and gamma-lithium aluminates, with minor amounts of alpha-lithium aluminate, lithium carbonate, and aluminum oxide. Surprisingly, the additional stir time did not affect the phases present in either the air dried samples or the samples heated to 650° C. The molar ratio of Al/Li was measured as 0.9 compared to a target ratio of 1.0. The powder surface area had decreased from 32 m$^2$/g for the 24 hours synthesis time to 22.4 m$^2$/g for the 100 hours synthesis time.

One hundred grams of this sol mix was milled for 16 hours in a 500 ml polypropylene jar with 120 grams of ¼ inch Al$_2$O$_3$ satellites. 4.1 grams of Saffil Al$_2$O$_3$ fiber were added and milled for 23 hours. To half of the mixture, 42 grams of a latex binder system were added and the slurry was cast onto a Teflon substrate using a 6 inch-wide doctor blade. The green density was 1.27 g/cc. A piece of the tape was heated to 650° C. for 24 hours after which the porosimetry was measured. The tape had a median pore diameter of 0.29 microns.

EXAMPLE III

In this example, the pH of the mixture was changed from basic to acidic by addition of nitric acid, HNO$_3$. 1204 grams of distilled water, 108 grams of lithium hydroxide hydrate, 200 grams of alumina trihydrate, and 227 grams of nitric acid were added to a stainless steel beaker. The mixture was heated at an average temperature of about 90° C. and stirred continuously for 100 hours. The pH of the solution was about 4 throughout the entire 100 hours of mixing. The molar ratio of Al/Li was measured as 0.97 compared to a target ratio of 1.0. A portion of the slip was then air dried.

After the dried sol was heated for 24 hours at 650° C., the powder had transformed to mainly a mixture of gamma-lithium aluminate and alpha-lithium aluminate with minor amounts of beta-lithium aluminate, lithium hydroxide, and lithium carbonate. The molar ratio of Al/Li was measured as 0.94 compared to a target ratio of 1.0. The surface area of the heat treated powder was measured at 25.2 m$^2$/g using B.E.T. nitrogen absorption.

Two hundred grams of this sol mix and 1.5 grams of dispersant were vibratory milled for 20 hours in a one liter polypropylene bottle containing 328 grams of alumina grinding media. Subsequently, 200 grams of an 8% cellulose binder solution, 8.21 grams of Saffil alumina fibers, 12 grams of plasticizer and 130 grams of propanol were added, and the mix was roll milled for 64 hours. The slurry was cast onto a Teflon substrate using a 6-inch wide doctor blade and allowed to air dry overnight. The green density of the dry tape was 1.4 g/cc.

EXAMPLE IV

In this example, 12 grams of distilled water, 108 grams of lithium hydroxide hydrate, 200 grams of hydrated alumina, and 8 grams of potassium hydroxide were added to a stainless steel beaker. The mixture was heated at an average temperature of 90° C. and stirred continuously for 100 hours. The pH of this solution was about 12. A portion of the slip was air dried. X-ray diffraction analysis revealed that the major phase present was lithium aluminum hydroxide hydrate and lithium hydroxide hydrate with minor amounts of potassium hydroxide hydrate and lithium carbonate. A trace amount of Gibbsite was also found in this sample. The molar ratio of Al/Li was measured as 1.0 compared to a target ratio of 1.0.

After the dried sol was heated for 24 hours at 650° C., the powder had transformed to mainly a mixture of alpha-lithium aluminate and beta-lithium aluminate with minor amounts of gamma-lithium aluminate, lithium carbonate, and aluminum oxide. The molar ratio of Al/Li was measured as 1.1 compared to a target ratio of 1.0. The surface area of the heat treated powder was measured as 26 m$^2$/gram using B.E.T. nitrogen absorption.

The effect of mix time at 90° C. was characterized for this slurry by drawing samples after 24 hours, 100 hours and 200 hours. Comparison of the X-ray diffraction (XRD) patterns of the 24-hour, 100, and 200-hour samples air dried and the XRD patterns of the samples heated for 24 hours at 650° C. in air, revealed that the major phases did not change with mix time. A change in the surface area of the samples heated to 650° C. was observed: as the mix time increased from 24 hours to 100 hours and then to 200 hours, the surface area of the samples increased from 15.7 m$^2$/gram to 26.5 m$^2$/gram for the 100 hour sample and 35 m$^2$/gram for the 200 hour sample.

Fifty grams of this sol and 1 gram of dispersant were vibratory milled in a 250 ml polypropylene bottle containing 120 grams of alumina grinding media for 4 hours. 1.7 grams of Saffil alumina fibers were added to the mixture and milled for 2 hours. The milled sol plus 25 grams of distilled water were added to 3 grams of methyl cellulose binder wet with 3 grams of plasticizer, 1 gram of release agent, and 1 gram of anti-foam agent, and mixed in a plastic beaker for 3 hours with a mechanical mixer. The slurry was cast onto a Teflon substrate using a 6-inch wide doctor blade and allowed to air dry overnight. The dry tape green density was 1.4 g/cc.

FIG. 2 shows the bench-scale (100-cm$^2$) life graph for a cell which incorporated three layers of the Example IV matrices for a total matrix thickness of 1.151 mm. The matrices were assembled with a state-of-the-art Ni-3 Cr anode, a stabilized cathode, and (Li, Na)$_2$CO$_3$ carbonate tapes to provide 35% electrode fill, 100% matrix fill, and lithium carbonate for the lithiation and corrosion reactions. The tapes were assembled into the cell in the "green" state with the binders intact. The cell was raised to 650° C. using the standard gas compositions and ramp procedures for bench scale cell tests. The cell operated for over 2000 hours prior to test termination for post-test analysis. The initial cell performance was comparable to that obtained with the standard tape cast matrices: 777 mV at 3 atm with humidified systems gases and 160 mA/cm$^2$, 60% Ut$_{fuel}$ and 40% Ut$_{ox}$ and a cell internal resistance of 1.5 mΩ. The decay rate of ~18 mV/1000 hours is significantly higher for this cell compared to the <2 mV/1000 hours obtained with the standard package but modifications to the beginning of life microstructure are being implemented to lower the decay rate.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A process for manufacture of molten carbonate fuel cell matrices comprising:

mixing at least one aluminate precursor material and at least one lithium salt in one of an aqueous solvent and an organic solvent, resulting in formation of a suspension;

heating said suspension to a temperature less than a boiling point of said one of said aqueous solvent and said organic solvent, resulting in formation of a slurry comprising at least one lithium aluminate precursor material;

adding at least one casting additive to said slurry;

forming said slurry into a flat sheet by one of tape casting, slip casting, curtain coating, extrusion and roll compaction and applying said flat sheet to a substrate material;

one of drying and curing said flat sheet, thereby yielding a green molten carbonate fuel cell component;

heat treating said flat sheet in one of air and a reducing environment so as to tailor at least one of a phase and a characteristic of a resulting powder comprising said flat sheet; assembling said flat sheet into a molten carbonate fuel cell; and heating said green molten carbonate fuel cell component after assembly into said molten carbonate fuel cell to a molten carbonate fuel cell operating temperature, resulting in transformation of said at least one lithium aluminate precursor material to lithium aluminate.

2. A process in accordance with claim 1, wherein said aluminate precursor is a hydrated alumina.

3. A process in accordance with claim 1, wherein said lithium salt is lithium hydroxide.

4. A process in accordance with claim 1, wherein said desired shape is dried by heating to evaporate said solvent.

5. A process in accordance with claim 1, wherein said desired shape is cured by exposure to radiation selected from the group consisting of UV, microwave, high-intensity visible light, electron beam, IR and combinations thereof.

6. A process in accordance with claim 1, wherein said lithium aluminate which is formed has a phase selected from the group consisting of alpha-phase, beta-phase, gamma-phase and mixtures thereof.

7. A process in accordance with claim 1, wherein said at least one casting additive is selected from the group consisting of binders, plasticizers, antifoam agents, dispersants and mixtures thereof.

8. A molten carbonate fuel cell matrix comprising:

a lithium aluminate structure produced by mixing at least one aluminate precursor material and at least one lithium salt in one of an aqueous solvent and an organic solvent, resulting in formation of a suspension, heating said suspension to a temperature less than a boiling point of said one of said aqueous solvent and said organic solvent, resulting in formation of a slurry comprising at least one lithium aluminate precursor material, adding at least one casting additive to said slurry, forming said slurry into a flat sheet by a process selected from the group consisting of tape casting, slip casting, curtain coating, extrusion and roll compaction and applying said flat sheet to a substrate material, one of drying and curing said flat sheet thereby yielding a green molten carbonate fuel cell structure, heat treating said flat sheet in one of air and a reducing environment so as to tailor at least one of a phase and a characteristic of a resulting powder comprising said flat sheet, assembling said flat sheet into a molten carbonate fuel cell, and heating said green molten carbonate fuel cell structure after assembly into aid molten carbonate fuel cell to a molten carbonate fuel cell operating temperature, resulting in transformation of said at least one lithium aluminate precursor material to lithium aluminate.

9. A molten carbonate fuel cell matrix in accordance with claim 8, wherein said aluminate precursor is a hydrated alumina.

10. A molten carbonate fuel cell matrix in accordance with claim 8, wherein said lithium salt is lithium hydroxide.

11. A molten carbonate fuel cell matrix in accordance with claim 8, wherein said desired shape is dried by heating to evaporate said solvent.

12. A molten carbonate fuel cell matrix in accordance with claim 8, wherein said desired shape is cured by exposure to radiation selected from the group consisting of UV, microwave, high-intensity visible light, electron beam, IR and combinations thereof.

13. A molten carbonate fuel cell matrix in accordance with claim 8, wherein said lithium aluminate which is formed has a phase selected from the group consisting of alpha-phase, beta-phase, gamma-phase and mixtures thereof.

14. A molten carbonate fuel cell matrix in accordance with claim 8, wherein said at least one casting additive is selected from the group consisting of binders, plasticizers, anti-foam agents, dispersants and mixtures thereof.

* * * * *